United States Patent
Moshavi et al.

(10) Patent No.: US 7,508,864 B2
(45) Date of Patent: Mar. 24, 2009

(54) APPARATUS AND METHOD OF CANCELING INTERFERENCE

(75) Inventors: Shimon Moshavi, Bet-Shemesh (IL); Daniel Yellin, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 11/056,226

(22) Filed: Feb. 14, 2005

(65) Prior Publication Data

US 2006/0209931 A1 Sep. 21, 2006

(51) Int. Cl.
*H04B 1/00* (2006.01)

(52) U.S. Cl. .................. 375/148; 375/144; 375/342; 375/147; 455/12.1; 455/67.3; 455/137; 370/342

(58) Field of Classification Search ............... 370/329, 370/342; 375/342, 147, 148, 144; 455/12.1, 455/67.3, 137
See application file for complete search history.

(56) References Cited

U.S. PATENT DOCUMENTS

| | | | | |
|---|---|---|---|---|
| 6,370,129 B1 * | 4/2002 | Huang | ........................ | 370/329 |
| 6,498,784 B1 | 12/2002 | Oezluetuerk | | |
| 6,570,909 B1 * | 5/2003 | Kansakoski et al. | ......... | 375/148 |
| 7,099,378 B2 * | 8/2006 | Dunyak et al. | .............. | 375/148 |
| 2003/0119451 A1 * | 6/2003 | Jang et al. | .................. | 455/67.3 |
| 2003/0124975 A1 * | 7/2003 | Ram et al. | .................. | 455/12.1 |
| 2005/0002445 A1 * | 1/2005 | Dunyak et al. | .............. | 375/148 |
| 2005/0141653 A1 * | 6/2005 | Perets et al. | ................ | 375/342 |
| 2007/0211790 A1 * | 9/2007 | Agrawal et al. | ............. | 375/147 |

FOREIGN PATENT DOCUMENTS

| | | |
|---|---|---|
| EP | 0 876 001 | 11/1998 |
| WO | WO 2004/105264 | 12/2004 |

OTHER PUBLICATIONS

Abe et al., "A Practical Throughput Comparison of MIMO-CDMA and MIMO-OFDM", Vehicular Technology Conference, IEEE 60th Los Angeles, CA, USA, Sep. 26, 2004, pp. 1431-1438.
International Search Report for PCT/US2006/004995 mailed Jun. 14, 2006.
Kang Min Lee et al., "CPICH Multipath Interference Canceller for HSDPA", R&D Center, Telson Electronics, Korea.

* cited by examiner

*Primary Examiner*—Sudhanshu C Pathak
(74) *Attorney, Agent, or Firm*—Pearl Cohen Zedek Latzer, LLP (57) ABSTRACT

Briefly, a wireless communication device having a receiver includes a pilot signal interference canceller and a linear interference suppressor is provided. The pilot signal interference canceller and the linear interference suppressor jointly operate to cancel a pilot signal interference and other interference which are part of a received signal. A method for jointly cancel the interference by the pilot signal interference canceller and the linear interference suppressor is also provided.

41 Claims, 2 Drawing Sheets

APPARATUS AND METHOD OF CANCELING INTERFERENCE

BACKGROUND OF THE INVENTION

In wireless communication systems, for example, cellular communication systems such as Wideband Code Division Multiple Access (WCDMA) and/or CDMA, a receiver may be based on a RAKE receiver architecture. The RAKE receiver may be used for an additive white Gaussian noise (AWGN) channel. For example, the CDMA/WCDMA cellular communication system may utilize Common Pilot Channels (CPICH) to broadcast pilot signals from base stations of the cellular system. The broadcast of multiple pilot signals may cause interference at the RAKE receiver. A Pilot Interference cancellation (IC) technique may be used to cancel the pilot signal interference. The Pilot IC technique may estimate and cancel at the RAKE receiver the interference effect of the broadcast.

Another technique for canceling interference is linear interference suppression. For example, in a linear interference suppression technique, a linear transformation (or a filter) may be applied to the input signal in order to reduce the interference seen by the receiver. One type of linear interference suppression technique may include linear Minimum Mean Squared Error (MMSE) processing, where a linear transformation/filter may be applied to the input signal to produce an output estimate of the desired symbol, thereby minimizing the mean square error (MSE).

Other linear interference suppression techniques, such as, for example a Decorrelating Multiuser detector and a zero-forcing equalizer are known in the art. In these two examples, the linear transformation may be optimized to completely eliminate the co-channel interference, without taking the noise level into account; thus, these receivers may suffer from noise enhancement. In contrast, in linear MMSE processing the applied linear transformtion may be dependent on the noise level.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 4 is a flowchart of a method of jointly canceling an interference according to exemplary embodiments of the invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, receivers of a radio system or the like. Portable communication devices intended to be included within the scope of the present invention may include, by a way of example only, cellular radiotelephone portable communication devices, digital communication system portable devices and the like.

Types of cellular radiotelephone systems intended to be within the scope of the present invention include, although are not limited to, Code Division Multiple Access (CDMA) and WCDMA cellular radiotelephone portable devices for transmitting and receiving spread spectrum signals, Global System for Mobile communication (GSM) cellular radiotelephone, Time Division Multiple Access (TDMA), Extended-TDMA (E-TDMA), General Packet Radio Service (GPRS), Extended GPRS, and the like.

For simplicity, although the scope of the invention is in no way limited in this respect, embodiments of the present that will be described below may be related to a CDMA family of cellular radiotelephone systems that may include CDMA, WCDMA, CDMA 2000 and the like. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by station 110, and/or by other suitable machines), cause the machine to perform a method and/or operations in accordance with embodiments of the invention Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Figure 1:
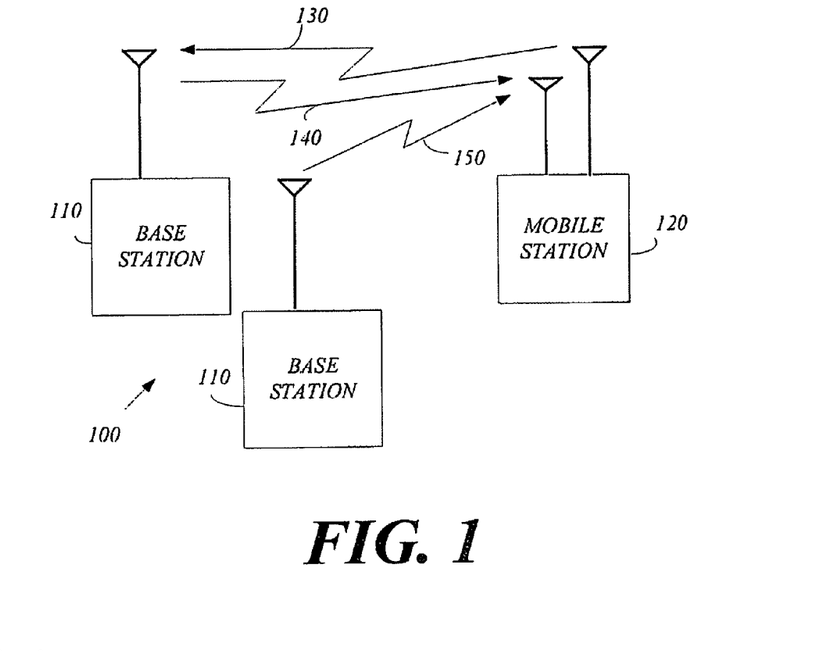
FIG. 1 is a block diagram of a wireless communication system according to an exemplary embodiment of the present invention.

Referring firstly to FIG. 1, a block diagram of a wireless communication system 100 according to some embodiments of the present invention is shown. Wireless communication system 100 may include a plurality of wireless communication devices for example, a base station and/or a plurality of base stations, and a mobile station and/or a plurality of mobile stations. For simplicity, base stations 110 and a mobile station 120 are shown.

Although the scope of the present invention is not limited in this respect, links, such as for example, an uplink and a downlink, may be used to transfer communications between base station 110 and mobile station 120. An uplink 130 may transfer communications from mobile station 120 to base station 110, and a downlink 140 may transfer communications from base station 110 to mobile station 120. Additionally, uplink 130 and downlink 140 may include one or more channels, which may be used for voice and data transportation. Furthermore, channels may carry signals, for example pilot signals 150, coded signals data signals and the like which may include symbols that include chips. Mobile station 120 may include one or more antennas and may receive pilot signals via the one or more antenna from the base stations 110.

Some of the signals may be spread over two or more multipaths and the symbols may be spread because of a delay between the multipaths components. In addition, multipath components may be referred to as diversity signals. For example, in these signals a symbol may be spread because of delays between other diversity signals. Signals providing diversity may include symbols that arise because of the multipath signals between a transmit antenna and a receiver, symbols that arise because of multiple transmit antennas at a single transmitter, and/or symbols that arise because of multiple transmitters. For example, multiple transmitters may provide diversity signals when performing a soft-handoff in a downlink CDMA system where multiple base stations may transmit the same symbol to a desired receiver.

Although the scope of the present invention is not limited in this respect, in an exemplary CDMA receiver, a baseband equivalent sampled receive signal may be represented as:

$$v = \sum_{b=1}^{B} \sum_{k=0}^{K} \sum_{s=1}^{N_{Sym}} H_b c_{b,k,s} S_{b,k,s} + n \qquad \text{Equation 1}$$

where B may be the number of base stations;
K may be the number of users;
$N_{Sym}$ may be the number of symbols;
n may be a vector containing noise samples with variance $\sigma^2$;
$S_{b,k,s}$ may be symbol s of user k for base b;
v,n may be vectors of length $N_s$ (e.g. number of samples in an observation window);
k=0 may correspond to the reference pilot signal; thus, $S_{b,0,s} = A_{b,Pilot}$, where $A_{b,Pilot}$ is the pilot signal transmit gain from base b;
c may be a vector of length N (number of 'chips'), where N may be larger than the sum of the observation window plus the delay spread. According to this exemplary embodiment, values in $c_{b,k,s}$ may be equal to zero except for the SF chip values associated with symbol s of user k for base b. For example, in commercial CDMA systems, the code waveforms of different users from the same base are orthogonal, thus, $c_{b,k_1,s}^t c_{b,k_2,s} = 0$, $k_1 \neq k_2$; and $H_b$ may be the Multipath channel matrix for the base station b. For example, $H_b$ may be a Toeplitz matrix, where each column represents the overall channel impulse response (including multipath channel, transmit chip pulse shape, and receive chip-matched filtering) of the corresponding clip in $c_{b,k,s}$.

In this exemplary embodiment of the invention, a CDMA code spreading factor may be SF, (e.g. SF code 'chips' per symbol) and an SPC samples per chip. For example, c may contain the CDMA signature spreading codes which may be a combination of base-station specific codes and user-specific codes, that may together change every symbol.

In the examples below, signals that may be processed based on Multiuser Detection may be assumed to have their CDMA code waveforms known at the receiver; signals that may be processed based on equalization may be assumed to treat the code chips as unknown zero-mean in dependent identically distributed random variables. Furthermore, in the example below all symbols may be assumed to be uncorrelated, e.g., no soft-handoff, that all users have spread factor SF, and a base station may transmit with a single antenna. The results may be extended to other symbol distributions, soft-handoff cases, multiple spread factors, and base station transmit diversity signals, if desired.

In some embodiments of the invention, the Pilot IC may refer to the cancellation of interference from pilot signals that are transmitted from the desired signal (i.e., "serving") base station and/or the pilot signals from surrounding base stations, if desired.

Although the scope of the present invention is not limited in this respect, the wireless communication device, e.g., mobile station 120, may include a CDMA receiver. The CDMA receiver may include a pilot interference canceller (Pilot IC) to cancel interference that may be caused by a received pilot signal and a linear interference suppressor to cancel interferences caused by other received signals, e.g. a data signal and the like.

Although the scope of the present invention is not limited in this respect, in some embodiments of the present invention, a number of linear interference suppression techniques may be used to optimize the linear interference suppressor for the existence of the Pilot IC at the receiver. According to embodiments of the invention, a joint linear interference suppression technique may be referred to as a linear interference suppression technique that is optimized for the presence of Pilot IC in the receiver.

Figure 2:
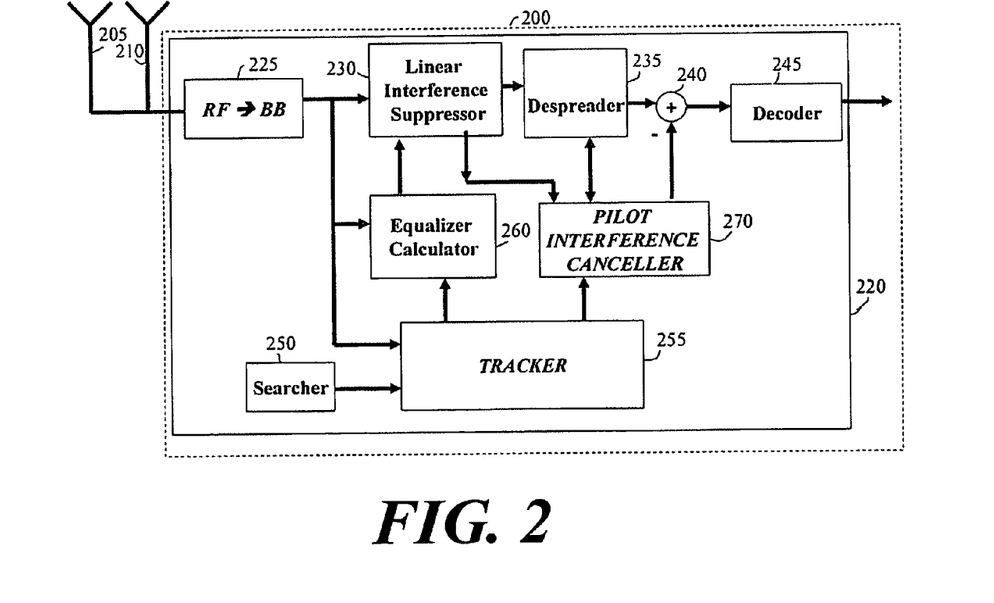
FIG. 2 is a block diagram of a wireless communication device according to exemplary embodiments of the invention.

Turning to FIG. 2 a block diagram of a wireless communication device according to exemplary embodiments of the invention is shown. Although the scope of the present invention is not limited in this respect, a wireless communication device 200 (e.g. mobile station of CDMA cellular system) may include antennas 205, 210 and a receiver 220. In this exemplary embodiment of the invention, receiver 220 may include a radio frequency (RF) to base band (BB) unit 225, a linear interference suppressor 230, a despreader 235, a combiner 240, a decoder 245, a searcher 250, a tracker 255, an equalizer calculator 260 and a pilot interference canceller 270.

Although the scope of the present invention is not limited in this respect, a signal which may include one or more pilot signals (e.g. pilot signal 150) and/or data signal may be received by both antennas 205, 210, if desired. According to some embodiments of the invention, antennas 205, 210 may include an internal antenna, a dipole antenna, an omni-directional antenna, a monopole antenna, an end fed antenna, a circularly polarized antenna, a micro-strip antenna, a diversity antenna, and the like.

According to some embodiments of the present invention, RF to BB unit 225 may demodulate the received signal and linear interference suppressor 230 may suppress interference that may be part of the received signal. Although the scope of the present invention is not limited in this respect, linear interference suppressor 230 may be optimized to suppress interference that is part of the received signal and to ignore interference caused by the pilot signal, if desired. Embodiments of the present invention may include linear interference suppressor 230 that may operate as a sample/symbol-level linear MMSE multiuser detector and/or a sample/symbol-level linear MMSE equalizer and/or a sample/symbol-level Linear Zero-Forcing Multiuser Detector and Equalization and/or a sample/symbol-level Linear MMSE Multiuser Detector and Equalizer and the like.

According to embodiments of the present invention, linear interference suppressor 230 may be optimized to jointly operate with pilot interference canceller 270 to jointly cancel the pilot signal interference and other interferences which are part of the received signal, if desired. Searcher 250 may search for one or more desired pilot signals. Tracker 255 may track the one or more desired pilot signals and pilot interference canceller 270 may cancel interference caused by the one or more desired pilot signals. In this embodiment of the invention, despreader 235 may despread the desired code of the received signal and the cancellation of the pilot interference may be done after despreader 235 at combiner 240, if desired. Equalizer calculator 260 may calculate optimized linear interference suppression for joint operation of linear interference suppressor 230 with the pilot interference canceller 270. Decoder 245, for example a Turbo decoder may decode the code, if desired.

Although the scope of the present invention is not limited in this respect, it should be understood that radio frequency (RF) to base band (BB) unit 225, linear interference suppressor 230, despreader 235, combiner 240, decoder 245, searcher 250, tracker 255, equalizer calculator 260 and pilot interference canceller 270 may be implemented in hardware, in software, and/or in any desirable combination of hardware and software.

Although the scope of the invention is not limited in this respect, one of the embodiments of the present invention may be joint sample-level linear MMSE Multiuser detector (e.g. linear interference suppressor 230) and pilot interference canceller 270.

In this embodiment of the invention, the sample-level linear MMSE Multiuser Detection (e.g. linear interference suppressor 230) may employ a linear transformation, for example Equation 2, that may minimize the mean square error between an estimated symbol and an actual symbol of the received signal, given the existence of pilot interference cancellation.

$$\min E \left| s_{b_o,k_o,s_o} - w^H \left( v - \sum_{b=1}^{B} \alpha_b H_b c_{b,o,s} A_{b,Pilot} \right) \right|^2, \quad \text{Equation 2}$$

where:
E may indicate the expectation operation;
$s_{b_o,k_o,s_o}$ may be the desired symbol;
$(\cdot)^H$ may indicate conjugate symmetric;

$\alpha_b$ may be a fraction of pilot signal canceled for base b; and
w may be the linear transform to solve for in order to obtain the linear MMSE solution, In this embodiment of the invention, an effective received signal may be defined with some and/or all of the pilot interference subtracted out:

$$\tilde{v} = v - \sum_{b=1}^{B} \alpha_b H_b c_{b,o,s} A_{b,Pilot} \quad \text{Equation 3}$$

Thus, the solution for Equation 2 may follow the below MMSE solution format:

$$w = E[\tilde{v}\tilde{v}^H]^{-1} E[\tilde{v} s_{b_o,k_o,s_o}^*] \quad \text{Equation 4}$$

which may be shown in this case to be:

$$w = \left( \sum_{b=1}^{B} \sum_{k=1}^{K} \sum_{s=1}^{N_{Sym}} p_{b,k,s} H_b c_{b,k,s} c_{b,k,s}^H H_b^H + (1-\alpha_b) \right. \quad \text{Equation 5}$$
$$\left. \sum_{b=1}^{B} P_{b,Pilot} \sum_{s=1}^{N_{Sym}} H_b c_{b,0,s} c_{b,0,s}^H H_b^H + \sigma^2 I \right)^{-1}$$
$$H_b c_{b_o,k_o,s_o}$$

where
$P_{b,k,s} = |s_{b,k,s}|^2$ may be the transmit power of symbol s of user k for base b; and
$P_{b,Pilot}$ may be the transmit pilot power from base b, and the solution may be dependent on all the CDMA codes. The parameter $\alpha_b$ may be a design parameter that may be used to model the accuracy of the pilot interference estimation and cancellation.

In some embodiments, there may be additional base station signals that may be modeled as a white noise as far as linear interference suppression 230 is concerned, i.e., $\sigma^2$ may include interference from other base stations. To perform pilot interference cancellation on signals from these base stations the noise term in Equation 5 may be replaced by:

$$\sigma^2 I \rightarrow \sigma^2 I - \sum_{b=B+1}^{B^*} \alpha_b \sigma_{b,Pilot}^2 \quad \text{Equation 6}$$

where $\sigma_{b,Pilot}^2$ may be the received pilot signal power from base b, if desired.

Although the scope of the invention is not limited in this respect, one of the embodiments of the present invention may be joint sample-level linear MMSE equalizer (e.g. linear interference suppressor 230) and pilot interference canceller 270.

In this embodiment of the invention, a linear transform that minimizes the mean square error in sample-level linear MMSE Equalization, given the existence of pilot interference cancellation, and given that all codes may be treated as random ('random spreading assumption') including the desired user code may be described as:

$$\min E|s_{b_o,k_o,s_o} c_{b_o,k_o,s_o} - w^H \tilde{v}|^2, \text{ random spreading} \quad \text{Equation 7}$$

where $c_{b_o,k_o,s_o}$ may contain the chips of the desired user's symbol, and the expectation operation may be carried out over all the codes (in addition to the symbols and noise). The solution to this may be depicted as:

$$w = E[\tilde{v}\tilde{v}^H]^{-1} E[\tilde{v} c_{b_o,k_o,s_o}^H s_{b_o,k_o,s_o}^*] \quad \text{Equation 8}$$
$$= \left( \sum_{b=1}^{B} (P_b - \alpha_b P_{b,Pilot}) H_b H_b^H + \sigma^2 I \right)^{-1} H_b$$

where $P_b$ may be the total transmit power from base station b. In this embodiment, if the pilot interference may be canceled from base stations whose signals are modeled as white noise, then the noise term in Equation 8 may break up as in Equation 6. Applying $w^H$ to the received signal may yield the desired chips. Thus, to recover the desired symbol $c_{b_o,k_o,s_o}^H w^H$ may be applied to the received signal.

Although the scope of the present invention is not limited in this respect, it should be known that there are various efficient ways to implement an MMSE equalizer type of receiver. In order to decrease edge effects, a single column of w may be selected as a sliding window correlator, (each time sliding one chip). In one embodiment where the number of samples per chip is 1, w may have a Toeplitz structure and the sliding window correlator may be implemented as a filter. In other embodiments of the invention, where samples per chip (SPC) is 2, the sliding window correlator may be implemented with two chip spaced filters, for example, the filters may be offset by one sample, if desired. It should be understood that other implementations of Equation 8 by hardware and/or by software and/or any combination of hardware and software may be possible.

Although the scope of the invention is not limited in this respect, one of the embodiments of the present invention may be joint sample-level linear MMSE Multiuser Detector and equalizer (e.g. linear interference suppressor 230) and pilot interference canceller 270. In this exemplary embodiment of the invention, some of the signal codes are assumed to be known at the receiver and may be processed via multiuser detection and some of the signal codes may be treated randomly and may be processed via equalization, if desired. In this embodiment of the invention, the linear transform may minimize the mean square error, given the existence of pilot interference cancellation. The linear transform may be depicted as:

$$w = E[\tilde{v}\tilde{v}^H]^{-1} E[\tilde{v} s_{b_o,k_o,s_o}^*] \quad \text{Equation 9}$$
$$\left( \sum_{b=1}^{B_1} \sum_{k=1}^{K} \sum_{s=1}^{N_{Sym}} p_{b,k,s} H_b c_{b,k,s} c_{b,k,s}^H H_b^H + (1-\alpha_b) \right.$$
$$\sum_{b=1}^{B_1} P_{b,Pilot} \sum_{s=1}^{N_{Sym}} H_b c_{b,0,s} c_{b,0,s}^H H_b^H +$$
$$\left. \sum_{b=B_1+1}^{B_1+B_2} (P_b - \alpha_b P_{b,Pilot}) H_b H_b^H + \sigma^2 I \right)^{-1}$$
$$H_b c_{b_o,k_o,s_o}$$

where it may be assumed that the code waveforms from $B_1$ base stations are known (including the desired user's code), and the code waveforms from $B_2$ base stations may be treated as random by the receiver (and thus, the expectation operation is also carried out over the codes from these $B_2$ base stations).

Although the scope of the invention is not limited in this respect, one of the embodiments of the present invention may be joint sample-level linear Zero-Forcing Multiuser Detector and Equalization (e.g. linear interference suppressor 230) and pilot interference canceller 270. In this embodiment of the invention the linear interference suppression may be based on a criterion of forcing the co-channel interference to zero, without taking the noise into account, if desired. The 'zero-forcing' detectors corresponding to Equations. 5, 8, and 9 may be found by setting the noise power term in these expressions to zero.

In an embodiment of the invention, a symbol-level linear interference suppression transform may be applied after multiplying the received signal with some Q×N, rectangular matrix A and may be depicted as:

$$y = A^H v = A^H \sum_{b=1}^{B} \sum_{k=0}^{K} \sum_{s=1}^{N_{Sym}} H_b c_{b,k,s} s_{b,k,s} + A^H n \quad \text{Equation 10}$$

For example, y may include matched-filter outputs for symbols received from signals transmitted from base stations. In this case, a column of matrix A may contain the equivalent code waveform of a different symbol (thus, $Q=B(K+1)N_{Sym}$).

In addition, the equivalent codes may include the effects of the overall channel impulse response (including transmit pulse shape and receive filter); thus, the equivalent code of symbol s, of signal k, of base station b may be expressed as $H_b c_{b,k,s}$. Another example may be where a column of A contains the signature code of the desired user shifted according to a different delay, if desired.

According to this exemplary embodiment of the invention, effective symbol level outputs may be defined as:

$$\tilde{y} = A^H \tilde{v} \quad \text{Equation 11}$$

where $\tilde{v}$ is defined in Equation 3. The linear transformation where desired user's code may treated as known may be depicted as:

$$w = E[\tilde{y}\tilde{y}^H]^{-1} E[\tilde{y} s_{b_o,k_o,s_o}^*] \quad \text{Equation 12}$$
$$= E[A^H \tilde{v}\tilde{v}^H A]^{-1} E[A^H \tilde{v} s_{b_o,k_o,s_o}^*]$$
$$= (A^H E[\tilde{v}\tilde{v}^H] A)^{-1} (A^H E[\tilde{v} s_{b_o,k_o,s_o}^*])$$

and for the case where the desired user's code is treated as random the linear transformation may be depicted as:

$$w = E[\tilde{y}\tilde{y}^H]^{-1} E[\tilde{y} c_{b_o,k_o,s_o}^H s_{b_o,k_o,s_o}^*] \quad \text{Equation 13}$$
$$= (A^H E[\tilde{v}\tilde{v}^H] A)^{-1} (A^H E[\tilde{v} c_{b_o,k_o,s_o}^H s_{b_o,k_o,s_o}^*])$$

Although the scope of the present invention is not limited in this respect, the above expectations may be carried out over some, all, or none of the spreading codes (in addition to the symbols and noise) depending on what information is assumed to be known a priori at the receiver. Possible solutions may thus, implicitly be derived from the expressions in Equations 5, 8, or 9. Similarly, linear zero-forcing solutions may be obtained by setting the noise power equal to zero in the resulting expressions.

Although the scope of the present invention is not limited in this respect, in some embodiments of the invention multiple antennas may be used. The above examples may be extended to the multiple antenna embodiment in a straightforward manner. For example, for the embodiment of MMSE linear interference suppression, the general solution of Equation 4 may be applicative, but all vectors should be augmented to include the multiple antenna signals. For example, in one embodiment of the invention, wireless communication device 200 may include two antennas (e.g. antennas 205, 210), the weight vector may include $w_1$ and $w_2$ for antennas 205 and 210 receive sample streams. In this embodiment, the pilot interference canceller may performed on antennas 205 and 210 and the effective received signal may be expanded to include $\tilde{v}_1$ and $\tilde{v}_2$, if desired.

Figure 3:
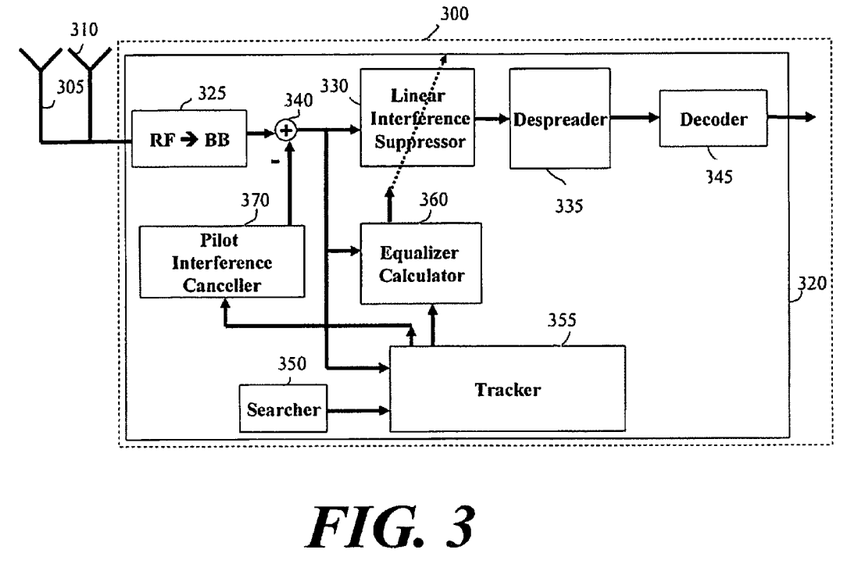
FIG. 3 is a block diagram of a wireless communication device according to another exemplary embodiment of the present invention.

Turning to FIG. 3 a block diagram of a wireless communication device according to exemplary embodiments of the invention is shown. Although the scope of the present invention is not limited in this respect, a wireless communication device 300 (e.g. mobile station of CDMA cellular system) may include antennas 305, 310 and a receiver 320. In this exemplary embodiment of the invention, receiver 320 may include a radio frequency (RF) to base band (BB) unit 325, a linear interference suppressor 330, a despreader 335, a combiner 340, a decoder 345, a searcher 350, a tracker 355, an equalizer calculator 360 and a pilot interference canceller 370.

Although the scope of the present invention is not limited in this respect, one notable difference between this embodiment of the invention and the embodiments described with reference to FIG. 2 above is that canceling the pilot interference by pilot interference canceller 370 may be applied before linear interference suppressor 360. However, the embodiment of Equations 2-13 may also be applied to this embodiment of the invention, although the scope of the present invention is in no way limited in this respect.

Figure 4:
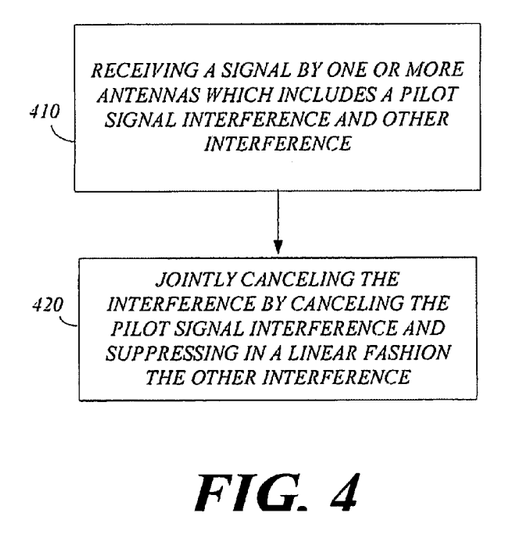

Turning to FIG. 4, a method of jointly canceling interference according to exemplary embodiments of the invention is shown. Although the scope of the present invention is not limited in this respect, a receiver of a wireless communication device (wireless communication device 200 and/or 300) may receive a signal for example, pilot signal via one or more antennas (e.g. antennas 205, 210 and/or antennas 305, 310). In some embodiments of the invention, the received signal may include, at least in part, an interference at the receiver. For example, the interference may include a pilot signal interference and other interference component such as, for example noise, data signals and the like (text box 410).

Although the scope of the present invention is not limited in this respect, the interference may be canceled by jointly operating a pilot signal interference canceller (e.g. pilot interference canceller 270, 370) and a linear interference suppressor (e.g. linear interference suppressor 230, 330). In some embodiments of the invention, the linear interference suppressor and the pilot interference canceller may jointly operate to cancel the interference. For example, the linear interference suppressor may optimize, as shown by Equations 2-13, to suppress in a linear fashion the other interference component and the pilot signal interference canceller may cancel at least a portion of the pilot signal interference (text box 420).

Although the scope of the present invention is not limited in this respect, in some embodiments, the received signal may be received by two or more antennas and the cancellation of the interference may be done by jointly operating the pilot signal interference canceller and the linear interference suppressor on a signal received by at least one antenna and/or by jointly operating the pilot signal interference canceller and the linear interference suppressor on a signal or signals received by the two or more antennas, if desired.

In some embodiments of the invention, the cancellation of the pilot signal interference may be done before suppressing the other interference component which may be part of the received signal and in other embodiments of the invention the other interference component may be suppressed before canceling the pilot signal interference, if desired.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of canceling interference in a received signal wherein the interference includes at least a pilot signal interference component and another interference signal component, the method comprising:

suppressing a linear interference according to a linear transform equation which includes:

$$w = \min E \left| s_{b_o,k_o,s_o} - w^H \left( v - \sum_{b=1}^{B} \alpha_b H_b c_{b,o,s} A_{b,pilot} \right) \right|^2,$$

where:

$$v - \sum_{b=1}^{B} \alpha_b H_b c_{b,o,s} A_{b,pilot}$$

depicted an effective received signal with the pilot signal interference;
E—is indicating an expectation operation;
$S_{b_o,k_o,S_o}$—is a desired symbol;
$C_{b_o,k_o,S_o}$—contains chips of a desired user's symbol;
$A_{b,pilot}$—is a pilot signal transmit gain from a base station b;
$H_b$—is a Multipath channel matrix for the base station b;
$(.)^H$—is indicating conjugate symmetric;
$\alpha_b$—is a fraction of pilot signal canceled for a base station b;
w—is a linear transform to be solved,
optimizing the linear transform equation of a linear interference suppressor based on an assumed a priori information on characteristics of the received signal and a pilot signal interference canceller operation;
jointly operating said linear interference suppressor with a pilot signal interference canceller to jointly cancel the pilot signal interference component and the other interference component of the receive signal.

2. The method of claim 1 comprising:
suppressing in a linear fashion the other interference signal component by the linear interference suppressor; and
canceling by the pilot signal interference canceller at least a portion of the pilot signal interference component by the pilot signal interference canceller.

3. The method of claim 1, comprising:
canceling the pilot signal interference by the pilot signal interference canceller before suppressing the other interference component by the linear interference suppressor.

4. The method of claim 1, comprising:
suppressing the other interference component before canceling the pilot signal interference component by the linear interference suppressor.

5. The method of claim 1 comprising:
receiving the received signal by two or more antennas; and
canceling the pilot signal interference component and other interference signal component received by at least one antenna of the two or more antennas by joint operation of the pilot interference canceller and the linear interference suppressor.

6. The method of claim 1 comprising:
receiving the received signal by two or more antennas;
canceling by the pilot signal interference canceller the pilot signal interference received by at least one antenna; and
canceling the pilot signal interference and suppressing in a linear fashion the other interference signal component received by the two or more antennas by joint operation of the pilot signal interference canceller and the linear interference suppressor.

7. A communication device comprising:
a receiver having a pilot signal interference canceller and a linear interference suppressor, wherein a linear transform equation of said linear interference suppressor optimized based on a priori information of an assumed received signal characteristic to the pilot signal interference canceller jointly operate with pilot signal interference canceller to cancel pilot signal interference and other interference in a received signal, wherein the linear transform equation depicted as:

$$w = \min E \left| s_{b_o,k_o,s_o} - w^H \left( v - \sum_{b=1}^{B} \alpha_b H_b C_{b,o,s} A_{b,pilot} \right) \right|^2,$$

where:

$$v - \sum_{b=1}^{B} \alpha_b H_b C_{b,o,s} A_{b,pilot}$$

depicted an effective received signal with the pilot signal interference;
E—is indicating an expectation operation;
$S_{b_o,k_o,s_o}$—is a desired symbol;
$C_{b_o,k_o,s_o}$—contains chips of a desired user's symbol;
$A_{b,pilot}$—is a pilot signal transmit gain from a base station b;
$H_b$—is a Multipath channel matrix for the base station b;
$(.)^H$—is indicating conjugate symmetric;
$\alpha_b$—is a fraction of pilot signal canceled for a base station $_b$; and
w—is a linear transform to be solved.

8. The communication device of claim 7, comprising:
two or more antennas to receive the received signal, wherein the linear interference suppressor and the pilot signal interference canceller are capable of jointly operate to suppress the other interference and canceling the pilot signal interference received by at least one antenna of the two or more antennas.

9. The communication device of claim 7, comprising:
two or more antennas to receive the received signal, wherein the linear interference suppressor and the pilot signal interference canceller are capable of jointly operate to suppress the other interference and canceling the pilot signal interference received by the two or more antennas.

10. The communication device of claim 7, wherein the pilot signal interference canceller is capable of canceling the pilot signal interference before the other interference is suppressed by the linear interference suppressor.

11. The communication device of claim 7, wherein the linear interference suppressor is able to suppress the other interference before the pilot signal interference is canceled by the pilot interference canceller.

12. The communication device of claim 7 comprising:
a despreader to despread symbols of the received signal, wherein the pilot signal interference canceller is capable of canceling the pilot signal interference after despreading the symbols of the received signal and suppressing the received signal by the linear interference suppressor.

13. The communication device of claim 12, wherein the pilot signal interference and the other interference include samples and the pilot signal interference canceller is capable of canceling one or more samples of the pilot signal interference before suppressing the other interference by the linear interference suppressor and before despreading the symbols of the received signal.

14. The communication device of claim 7, wherein the linear interference suppressor comprises a minimum mean square error multiuser detector.

15. The communication device of claim 7, wherein the linear interference suppressor comprises a combined minimum mean square error multiuser detector and equalizer.

16. The communication device of claim 7, wherein the linear interference suppressor comprises a minimum mean square error equalizer.

17. The communication device of claim 7, wherein the linear interference suppressor comprises a decorrelating detector.

18. The communication device of claim 7, wherein the linear interference suppressor comprises a zero-forcing equalizer.

19. A wireless communication device comprising:
a dipole antenna to receive a received signal; and
a receiver having a pilot signal interference canceller and a linear interference suppressor, wherein a linear transform equation of said linear interference suppressor optimized the pilot signal interference canceller based on a priori information of an assumed received signal characteristic to jointly operate with pilot signal interference canceller to cancel pilot signal interference and other interference in a received signal, wherein the linear transform equation depicted as:

$$w = \min E \left| s_{b_o,k_o,s_o} - w^H \left( v - \sum_{b=1}^{B} \alpha_b H_b C_{b,o,s} A_{b,pilot} \right) \right|^2,$$

where:

$$v - \sum_{b=1}^{B} \alpha_b H_b C_{b,o,s} A_{b,pilot}$$

depicted an effective received signal with the pilot signal interference;

E—is indicating an expectation operation;
$S_{b_o,k_o,S_o}$—is a desired symbol;
$C_{b_o,k_o,S_o}$—contains chips of a desired user's symbol;
$A_{b,pilot}$—is a pilot signal transmit gain from a base station b;
$H_b$—is a Multipath channel matrix for the base station b;
$(.)^H$—is indicating conjugate symmetric;
$\alpha_b$—is a fraction of pilot signal canceled for a base station b; and
w—is a linear transform to be solved.

20. The wireless communication device of claim 19, comprising:
two or more antennas to receive the received signal, wherein the linear interference suppressor and the pilot signal interference canceller are capable of jointly operate to suppress the other interference and canceling the pilot signal interference received by at least one antenna of the two or more antennas.

21. The wireless communication device of claim 19 comprising:
two or more antennas to receive the received signal, wherein the linear interference suppressor and the pilot signal interference canceller are capable of jointly operate to suppress the other interference and canceling the pilot signal interference received by the two or more antennas.

22. The wireless communication device of claim 19 comprising:
a despreader to despread symbols of the received signal, wherein the pilot signal interference canceller is capable of canceling the pilot signal interference after despreading the symbols of the received signal and suppressing the received signal by the linear interference suppressor.

23. The wireless communication device of claim 22, wherein the pilot signal interference and the other interference include samples and wherein the pilot signal interference canceller is capable of canceling one or more samples of the pilot signal interference before suppressing the other interference by the linear interference suppressor and before despreading the symbols of the received signal.

24. A wireless communication system comprising:
a wireless communication device having a receiver including a pilot signal interference canceller and a linear interference suppressor, wherein a linear transform equation of said linear interference suppressor optimized based on a priori information of an assumed received signal characteristic to jointly operate with the pilot signal interference canceller to cancel pilot signal interference and other interference in a received signal, wherein the linear transform equation depicted as:

$$w = \min E \left| s_{b_o,k_o,s_o} - w^H \left( v - \sum_{b=1}^{B} \alpha_b H_b c_{b,o,s} A_{b,pilot} \right) \right|^2,$$

where:

$$v - \sum_{b=1}^{B} \alpha_b H_b c_{b,o,s} A_{b,pilot}$$

depicted an effective received signal with the pilot signal interference;
E—is indicating an expectation operation;
$S_{b_o,k_o,S_o}$—is a desired symbol;
$C_{b_o,k_o,S_o}$—contains chips of a desired user's symbol;
$A_{b,pilot}$—is a pilot signal transmit gain from a base station b;
$H_b$—is a Multipath channel matrix for the base station b;
$(.)^H$—is indicating conjugate symmetric; $\alpha_b$—is a fraction of pilot signal canceled for a base station b; and
w—is a linear transform to be solved.

25. The wireless communication system of claim 24, comprising:
two or more antennas to receive the received signal, wherein the linear interference suppressor and the pilot signal interference canceller are capable of jointly operate to suppress the other interference and canceling the pilot signal interference received by at least one antenna of the two or more antennas.

26. The wireless communication device of claim 24 comprising:
a despreader to despread symbols of the received signal, wherein the pilot signal interference canceller is capable of canceling the pilot signal interference after despreading the symbols of the received signal and suppressing the received signal by the linear interference suppressor.

27. The wireless communication device of claim 26, wherein the pilot signal interference and the other interference include samples and wherein the pilot signal interference canceller is capable of canceling one or more samples of the pilot signal interference before suppressing the other interference by the linear interference suppressor and before despreading the symbols of the received signal.

28. An article comprising:
a storage medium, having stored thereon instructions, that when executed, result in:
suppressing a linear interference according to a linear transform equation which includes:

$$w = \min E \left| s_{b_o,k_o,s_o} - w^H \left( v - \sum_{b=1}^{B} \alpha_b H_b c_{b,o,s} A_{b,pilot} \right) \right|^2,$$

where:

$$v - \sum_{b=1}^{B} \alpha_b H_b c_{b,o,s} A_{b,pilot}$$

depicted an effective received signal with the pilot signal interference;
E—is indicating an expectation operation;
$S_{b_o,k_o,S_o}$—is a desired symbol;
$C_{b_o,k_o,S_o}$—contains chips of a desired user's symbol;
$A_{b,pilot}$—is a pilot signal transmit gain from a base station b;
$H_b$—is a Multipath channel matrix for the base station b:
$(.)^H$—is indicating conjugate symmetric:
$\alpha_b$—is a fraction of pilot signal canceled for a base station b;
w—is a linear transform to be solved; and
optimizing the linear transform equation of a linear interference suppressor based on an assumed a priori information on. characteristics of the received signal to jointly operate with a pilot signal interference canceller to jointly cancel a pilot signal interference component and the other interference component of the receive signal.

29. The article of claim 28, wherein the instructions when executed result in:
   suppressing in a linear fashion other interference components of the interference; and
   canceling by the pilot signal interference canceller at least a portion of a pilot signal interference which is a portion of the interference.

30. The article of claim 29, wherein the instructions when executed result in:
   receiving the received signal by two or more antennas; and
   canceling the pilot signal interference component and other interference component received by at least one antenna of the two or more antennas by joint operation of the pilot interference canceller and the linear interference suppressor.

31. The article of claim 28, wherein the instructions when executed result in:
   canceling the pilot signal interference before suppressing other interference component.

32. The article of claim 28, wherein the instructions when executed result in:
   suppressing other interference component before canceling the pilot signal interference.

33. A method comprising:
   providing an equation which ignores presence of a pilot signal interference, said equation depicted as:

$$w = E[\tilde{v}\tilde{v}^H]^{-1} E[\tilde{v} s^*_{b_o,k_o,s_o}]$$

Where,
   w—is a linear transform to be solve;
   E—is indicating an expectation operation;
   $S_{b_o,k_o,s_o}$—is a desired symbol;
   $(.)^H$—is indicating conjugate symmetric; and
   $\tilde{v}$—is indicting an effective received signal;
   optimizing a linear transform equation of a linear interference suppressor based on an assumed a priori information on characteristics of the received signal and a pilot signal interference canceller operation; and
   jointly operating said linear interference suppressor with a pilot signal interference canceller to jointly cancel the pilot signal interference component and the other interference component of the receive signal.

34. The method of claim 1, wherein optimizing comprising:
   optimizing the liner transform equation for jointly operation of a sample-level linear Minimum Mean Squared Error (MMSE) Multiuser detector, an equalizer and the pilot interference canceller based on an a priori assumption that at least some of the signal codes are processed by multiuser detector and at least some of the signal codes are treated randomly and processed by the equalizer to minimize the mean square error, given the existence of pilot interference cancellation.

35. A method comprising:
   optimizing a linear transform equation of a linear interference suppressor based on an assumed a priori information on characteristics of the received signal and a pilot signal interference canceller operation;
   jointly operating said linear interference suppressor with a pilot signal interference canceller to jointly cancel the pilot signal interference component and the other interference component of the receive signal; and
   using the linear transform equation which depicted as:

$$w = E[\tilde{v}\tilde{v}^H]^{-1} E[\tilde{v} s^*_{b_o,k_o,s_o}]$$

$$= \left( \sum_{b=1}^{B_1} \sum_{k=1}^{K} \sum_{s=1}^{N_{Sym}} p_{b,k,s} H_b c_{b,k,s} c^H_{b,k,s} H_b^H + \right.$$
$$(1-\alpha_b) \sum_{b=1}^{B_1} P_{b,Pilot} \sum_{s=1}^{N_{Sym}} H_b c_{b,0,s} c^H_{b,0,s} H_b^H +$$
$$\left. \sum_{b=B_1+1}^{B_1+B_2} (P_b - \alpha_b P_{b,Pilot}) H_b H_b^H + \sigma^2 I \right)^{-1} H_b c_{b_o,k_o,s_o}$$

Where,
   E—indicate an expectation operation;
   $S_{b_o,k_o,s_o}$—is a desired symbol;
   $C_{b_o,k_o,s_o}$—contains chips of a desired user's symbol;
   $H_b$—is a Multipath channel matrix for the base station b;
   $(.)^H$—is indicating conjugate symmetric;

$$p_{b,k,s} = |s_{b,k,s}|^2$$

is a transmit power of symbol $^S$ of user $^k$ for base station $^b$;
   $P_{b,Pilot}$—is a transmit pilot power from base station b,
   K—is the number of users;
   $N_{Sym}$—is the number of symbols;
   $\sigma^2$ is an interference from other base stations;
   $\alpha_b$—is a fraction of pilot signal canceled for base station b ; and
   w—is a linear transform to be solved.

36. A communication device comprising:
   a receiver having a pilot signal interference canceller and a linear interference suppressor, wherein a linear transform equation of said linear interference suppressor optimized based on a priori information of an assumed received signal characteristic to the pilot signal interference canceller jointly operate with pilot signal interference canceller to cancel pilot signal interference and other interference in a received signal, wherein the linear transform equation depicted as:

$$w = E[\tilde{v}\tilde{v}^H]^{-1} E[\tilde{v} s^*_{b_o,k_o,s_o}]$$

Where,
   w—is a linear transform to be solve;
   E—is indicating an expectation operation;
   $S_{b_o,k_o,s_o}$—is a desired symbol;
   $(.)^H$—is indicating conjugate symmetric; and
   $\tilde{v}$—is indicting an effective received signal.

37. A communication device comprising:
   a receiver having a pilot signal interference canceller and a linear interference suppressor, wherein a linear transform equation of said linear interference suppressor optimized based on a priori information of an assumed received signal characteristic to the pilot signal interference canceller jointly operate with pilot signal interference canceller to cancel pilot signal interference and other interference in a received signal, wherein the linear transform equation depicted as:

$$w = E[\tilde{v}\tilde{v}^H]^{-1}E[\tilde{v}s^*_{b_o,k_o,s_o}]$$

$$= \left( \sum_{b=1}^{B_1}\sum_{k=1}^{K}\sum_{s=1}^{N_{Sym}} p_{b,k,s}H_b c_{b,k,s} c^H_{b,k,s} H^H_b + \right.$$
$$(1-\alpha_b)\sum_{b=1}^{B_1} P_{b,Pilot} \sum_{s=1}^{N_{Sym}} H_b c_{b,0,s} c^H_{b,0,s} H^H_b +$$
$$\left. \sum_{b=B_1+1}^{B_1+B_2} (P_b - \alpha_b P_{b,Pilot})H_b H^H_b + \sigma^2 I \right)^{-1} H_b c_{b_o,k_o,s_o}$$

Where,
E—indicate an expectation operation;
$S_{b_o,k_o,S_o}$—is a desired symbol;
$C_{b_o,k_o,S_o}$—contains chips of a desired user's symbol;
$H_b$—is a Multipath channel matrix for the base station b;
$(.)^H$—is indicating conjugate symmetric;

$$p_{b,k,s} = |s_{b,k,s}|^2$$

is a transmit power of symbol $S$ of user $k$ for base station $b$;
$P_{b,Pilot}$—is a transmit pilot power from base station b,
K—is the number of users;
$N_{Sym}$—is the number of symbols;
$\sigma^2$ interference from other base stations;
$\alpha_b$—is a fraction of pilot signal canceled for base station b; and
w—is a linear transform to be solved.

38. A wireless communication device comprising:
a dipole antenna to receive a received signal; and
a receiver having a pilot signal interference canceller and a linear interference suppressor, wherein a linear transform equation of said linear interference suppressor optimized the pilot signal interference canceller based on a priori information of an assumed received signal characteristic to jointly operate with pilot signal interference canceller to cancel pilot signal interference and other interference in a received signal, wherein the linear transform equation depicted as:

$$w = E[\tilde{v}\tilde{v}^H]^{-1}E[\tilde{v}s^*_{b_o,k_o,s_o}]$$

Where,
w—is a linear transform to be solve;
E—is indicating an expectation operation;
$S_{b_o,k_o,S_o}$—is a desired symbol;
$(.)^H$—is indicating conjugate symmetric; and
$\tilde{v}$—is indicting an effective received signal.

39. A wireless communication device comprising:
a dipole antenna to receive a received signal; and
a receiver having a pilot signal interference canceller and a linear interference suppressor, wherein a linear transform equation of said linear interference suppressor optimized the pilot signal interference canceller based on a priori information of an assumed received signal characteristic to jointly operate with pilot signal interference canceller to cancel pilot signal interference and other interference in a received signal, wherein the linear transform equation depicted as:

$$w = E[\tilde{v}\tilde{v}^H]^{-1}E[\tilde{v}s^*_{b_o,k_o,s_o}]$$

$$= \left( \sum_{b=1}^{B_1}\sum_{k=1}^{K}\sum_{s=1}^{N_{Sym}} p_{b,k,s}H_b c_{b,k,s} c^H_{b,k,s} H^H_b + \right.$$
$$(1-\alpha_b)\sum_{b=1}^{B_1} P_{b,Pilot} \sum_{s=1}^{N_{Sym}} H_b c_{b,0,s} c^H_{b,0,s} H^H_b +$$
$$\left. \sum_{b=B_1+1}^{B_1+B_2} (P_b - \alpha_b P_{b,Pilot})H_b H^H_b + \sigma^2 I \right)^{-1} H_b c_{b_o,k_o,s_o}$$

Where,
E—indicate an expectation operation;
$S_{b_o,k_o S_o}$—is a desired symbol;
$C_{b_o,k_o,S_o}$—contains chips of a desired user's symbol;
$H_b$—is a Multipath channel matrix for the base station b;
$(.)^H$—is indicating conjugate symmetric;

$$p_{b,k,s} = |s_{b,k,s}|^2$$

is a transmit power of symbol $S$ of user $k$ for base station $b$;
$P_{b,Pilot}$—is a transmit pilot power from base station b,
K—is the number of users;
$N_{Sym}$—is the number of symbols;
$\sigma^2$ is an interference from other base stations;
$\alpha_b$—is a fraction of pilot signal canceled for base station b ; and
w—is a linear transform to be solved.

40. A wireless communication system comprising:
a wireless communication device having a receiver including a pilot signal interference canceller and a linear interference suppressor, wherein a linear transform equation of said linear interference suppressor optimized based on a priori information of an assumed received signal characteristic to jointly operate with the pilot signal interference canceller to cancel pilot signal interference and other interference in a received signal, wherein the linear transform equation depicted as:

$$w = E[\tilde{v}\tilde{v}^H]^{-1}E[\tilde{v}s^*_{b_o,k_o,s_o}]$$

Where,
w—is a linear transform to be solve;
E—is indicating an expectation operation;
$S_{b_o,k_o,S_o}$—is a desired symbol;
$(.)^H$—is indicating conjugate symmetric; and
$\tilde{v}$—is indicting an effective received signal.

41. A wireless communication system comprising:
a wireless communication device having a receiver including a pilot signal interference canceller and a linear interference suppressor, wherein a linear transform equation of said linear interference suppressor optimized based on a priori information of an assumed received signal characteristic to jointly operate with the pilot signal interference canceller to cancel pilot signal interference and other interference in a received signal, wherein the linear transform equation depicted as:

$$w = E[\tilde{v}\tilde{v}^H]^{-1} E[\tilde{v}s^*_{b_o,k_o,s_o}]$$

$$= \left( \begin{array}{c} \sum_{b=1}^{B_1} \sum_{k=1}^{K} \sum_{s=1}^{N_{Sym}} p_{b,k,s} H_b c_{b,k,s} c^H_{b,k,s} H^H_b + \\ (1-\alpha_b) \sum_{b=1}^{B_1} P_{b,Pilot} \sum_{s=1}^{N_{Sym}} H_b c_{b,0,s} c^H_{b,0,s} H^H_b + \\ \sum_{b=B_1+1}^{B_1+B_2} (P_b - \alpha_b P_{b,Pilot}) H_b H^H_b + \sigma^2 I \end{array} \right)^{-1} H_b c_{b_o,k_o,s_o}$$

Where,
E—indicate an expectation operation;
$S_{b_o,k_o,s_o}$—is a desired symbol;
$C_{b_o,k_o,s_o}$—contains chips of a desired user's symbol;
$H_b$—is a Multipath channel matrix for the base station b;
$(.)^H$—is indicating conjugate symmetric;

$$p_{b,k,s} = |s_{b,k,s}|^2$$

is a transmit power of symbol $S$ of user $k$ for base station $b$;
$P_{b\text{-}Pilot}$—is a transmit pilot power from base station b,
K—is the number of users;
$N_{Sym}$—is the number of symbols;
$\sigma^2$ is an interference from other base stations;
$\alpha_b$—is a fraction of pilot signal canceled for base station b; and
w—is a linear transform to be solved.

* * * * *